March 4, 1930.  J. H. SMITH  1,748,962
TAP
Filed Feb. 15, 1926
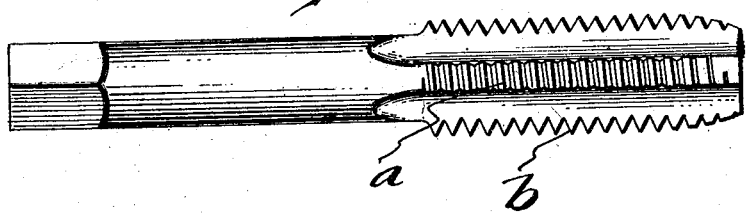
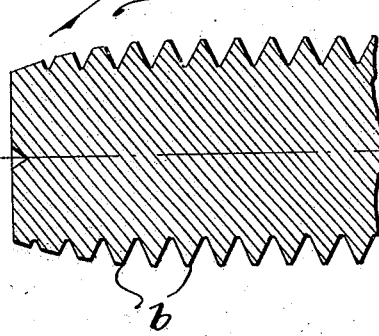 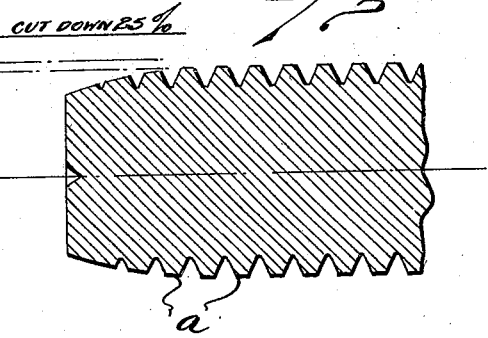
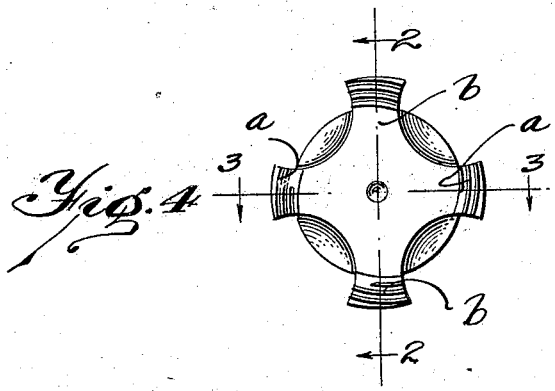
INVENTOR.
John Hugo Smith
BY
ATTORNEY.

Patented Mar. 4, 1930

1,748,962

UNITED STATES PATENT OFFICE

JOHN HUGO SMITH, OF DETROIT, MICHIGAN, ASSIGNOR TO THE WESSON SALES COMPANY, OF DETROIT, MICHIGAN, A CORPORATION OF MICHIGAN

TAP

Application filed February 15, 1926. Serial No. 88,246.

This invention relates to taps for threading holes. It is the object of the invention to provide a tap which will turn with less friction and put less strain on the material of which it is made, and therefore last longer. This is accomplished by alternating the radial projection of the lands, both on the working part of the tool and the piloting part of the tool.

In the drawings:

Fig. 1 is an elevation of a tap constructed in accordance with my invention and showing two lands having normal cutting teeth.

Fig. 2 is a longitudinal fragmentary section of the working end of the tap and taken on line 2—2 of Fig. 4 and through one set of lands of normal dimensions.

Fig. 3 is a view similar to Fig. 2 but taken on line 3—3 of Fig. 4 and through an alternate set of lands which are reduced in diameter.

Fig. 4 is an end elevation of the tap shown in Fig. 1 and illustrating the different diameters of the teeth in the tap including the teeth in the working part, and the bottoming part of the tap.

The shank has the usual land and intervening flutes, but the radial projection of the teeth on every other of the lands, designated $a$, is cut down approximately 25% the depth of the teeth of the lands $b$. This is very well shown in comparing Figs. 2 and 3. However, I do not want to be limited to any specific percentage of variation. The angularity of the teeth in all the lands is preferably the same.

The only teeth in cutting the thread which work are those at the end of the tap, known as the start, which are less than the teeth in the full diameter of the tap. The other teeth are simply pilot teeth which guide and steady the tool, and some of which may eventually become working teeth when the tool is ground back in resharpening it.

I find by actual experience that by cutting off the crest of the teeth on some of the lands, that a great deal of the friction in the operation of the tool is eliminated, especially is this true with the large number of teeth that are really pilot teeth. The fact that these teeth do not reach to the bottom of the thread eliminates a considerable amount of the friction. Also it allows a better distribution of the lubricant which can pass under each alternate land. This gives the lubricant double the time in which to gather before encountering the full depth tooth, and considerably better lubricates all the pilot teeth. This, therefore, provides two factors tending to lessen the resistance to the turning of the tool, to wit: better lubrication, and less area of surfaces in contact.

Also, in the actual working teeth of the tool I find better results for the reason that alternate teeth cut only the sides of the thread, while the other set of alternate teeth cut both the sides and the depth.

The over all diameter of the teeth of each land is the same except the working end of the tool where it gradually diminishes. However, the root diameter of all the teeth is the same. The teeth on this portion of the tool where the over all diameter of the teeth is not diminished are not relieved, as will be apparent from a comparison of Figs. 1 and 4.

The root diameter being maintained uniform throughout it will be obvious that the tool may be ground back as it wears. The teeth not being relieved, it will be apparent these teeth may be readily sharpened by enlarging flutes through grinding without in any way varying the size of the thread which can be produced by the tap.

What I claim is:

A bottoming tap for cutting threads, comprising a shank having a plurality of longitudinally running and circumferentially spaced lands and flutes, the lands provided with cutting teeth and the tops of the teeth on alternate lands being partially removed, the teeth forming each land being uniform in root diameter and in over-all diameter, except at the working end where the root diameter is maintained but the over-all diameter gradually diminished, the crest of each tooth of uniform over-all diameter being in the form of a segment of a true circle and the crest of each tooth at the working end of the tool being relieved.

In testimony whereof I affix my signature.

JOHN HUGO SMITH.